(12) United States Patent
Chardon

(10) Patent No.: US 8,561,948 B2
(45) Date of Patent: Oct. 22, 2013

(54) METHOD FOR ENSURING THE SAFETY OF AN AIRCRAFT FLYING HORIZONTALLY AT LOW SPEED

(75) Inventor: Stephane Chardon, Saint-Orens de Gameville (FR)

(73) Assignee: Airbus Operations SAS, Toulouse (FR)

( * ) Notice: Subject to any disclaimer, the term of this patent is extended or adjusted under 35 U.S.C. 154(b) by 1259 days.

(21) Appl. No.: 11/604,296

(22) Filed: Nov. 27, 2006

(65) Prior Publication Data

US 2008/0272242 A1 Nov. 6, 2008

(30) Foreign Application Priority Data

Nov. 29, 2005 (FR) ...................................... 05 12048

(51) Int. Cl.
*G05D 1/00* (2006.01)

(52) U.S. Cl.
USPC ............. 244/194; 244/87; 244/212; 244/76 R

(58) Field of Classification Search
USPC .......... 244/212, 39, 217, 87, 90 R, 76 R, 175, 244/180, 181, 194, 195; 701/4–6, 15, 16, 701/18

See application file for complete search history.

(56) References Cited

U.S. PATENT DOCUMENTS

| | | | | |
|---|---|---|---|---|
| 3,138,353 A * | 6/1964 | Steiner | ............................. | 244/87 |
| 3,275,269 A | 9/1966 | Yiotis | | |
| 3,522,729 A * | 8/1970 | Miller | ......................... | 73/178 R |
| 3,575,363 A * | 4/1971 | Jenny et al. | ..................... | 244/13 |
| 3,822,047 A | 7/1974 | Schuldt, Jr. | | |
| 4,043,523 A * | 8/1977 | Bartoe, Jr. | ......................... | 244/87 |
| 4,106,730 A * | 8/1978 | Spitzer et al. | .................. | 244/183 |
| 4,319,219 A | 3/1982 | Rein-Weston | | |
| 5,112,009 A * | 5/1992 | Farineau | ......................... | 244/181 |
| 2005/0218262 A1 * | 10/2005 | Boe et al. | ......................... | 244/87 |
| 2005/0242235 A1 * | 11/2005 | Delaplace et al. | ............ | 244/75.1 |
| 2009/0065636 A1 * | 3/2009 | Mathieu | .......................... | 244/87 |

FOREIGN PATENT DOCUMENTS

| | | |
|---|---|---|
| GB | 823592 | 11/1959 |
| GB | 1259393 | 1/1972 |

OTHER PUBLICATIONS

Federation of American Scientists (FAS), C-130 Hercules, last updated Feb. 20, 2000, <http://www.fas.org/man/dod-101/sys/ac/c-130.htm>, as viewed by www.archive.org on Oct. 14, 2004 via <http://web.archive.org/web/20041014084539/http://www.fas.org/man/dod-101/sys/ac/c-130.htm>.*

U.S. Centennial of Flight Commission, untitled, <http://www.centennialofflight.gov/essay/Theories_of_Flight/Devices/TH17G5.htm> as viewed by www.archive.org on Apr. 30, 2003 via <http://web.archive.org/web/20030430092155/http://www.centennialofflight.gov/essay/Theories_of_Flight/Devices/TH17G5.htm.*

Airbus Military, Press Releases, <www.airbusmilitary.com/pressrelease.html> as viewed by www.archive.org on Dec. 8, 2003 via <http://web.archive.org/web/20031208084216/airbusmilitary.com/pressrelease.html>.*

Preliminary Search Report dated Aug. 31, 2006.

* cited by examiner

*Primary Examiner* — Philip J Bonzell

(74) *Attorney, Agent, or Firm* — Dickinson Wright PLLC

(57) ABSTRACT

A method for ensuring the safety of an aircraft flying horizontally at low speed includes an operation in which, when the flaps of the aircraft are disposed in a maximum extended position and are blown on by airscrews, the flaps are at least partially retracted, automatically, based on whether the thrust of the engines is at least equal to a predetermined lift value.

11 Claims, 3 Drawing Sheets

METHOD FOR ENSURING THE SAFETY OF AN AIRCRAFT FLYING HORIZONTALLY AT LOW SPEED

FIELD OF THE INVENTION

The present invention relates to a method for ensuring the safety of an aircraft flying horizontally at low speed, for example no more than slightly greater than the angle of attack protection speed, said aircraft comprising:
- a fixed wing supporting trailing-edge high-lift flaps and engines provided with airscrews, the latter blowing on said wings and said flaps; and
- a stabilizing horizontal tail group, tilt-adjustable.

BACKGROUND OF THE INVENTION

It is known that, in such a phase of horizontal flight at low speed, the lift imparted on the aircraft by its wings and said flaps, then in the extended position, needs to be high, such that this high lift, reinforced by the blowing on the wings and the extended flaps by the airscrews of the engines and aided by the thrust of said engines, generates a high pitch-down moment relative to the center of gravity of the aircraft.

To balance the aircraft, the pilot deflects said adjustable horizontal tail group to nose up, so that it generates, relative to the center of gravity of the aircraft, a nose-up moment to counteract said high nose-down moment. This balancing nose-up moment must therefore be high, such that the local impact on said adjustable horizontal tail group is strongly negative.

The result is that if, during such a phase of flying horizontally at low speed, the pilot orders a dive, for example to abruptly avoid another aircraft by flying under it to avoid a collision or to rapidly regain speed, the local impact on said adjustable horizontal tail group risks exceeding the stalling effect of the latter, such that, at the moment when the pilot wants to stop the dive maneuver, the adjustable horizontal tail group may have lost its effectiveness: the aircraft will therefore be incapable of priming a flare and this could result in the loss of the aircraft.

BRIEF SUMMARY OF THE INVENTION

The object of the present invention is to remedy this drawback.

To this end, according to the invention, the method for ensuring the safety of an aircraft flying horizontally at low speed, said aircraft comprising:
- a fixed wing supporting engines provided with airscrews, and trailing-edge high-lift flaps, that can be extended and retracted; and
- a stabilizing horizontal tail group, tilt-adjustable, provided with elevators, said flaps then being in the maximum extended position and being blown on by said airscrews,
is noteworthy in that said flaps are at least partially retracted when the thrust of said engines is at least equal to a predetermined high value.

Thus, thanks to such a retraction, the blowing effect on said flaps by the airscrews is reduced and said nose-down moment is therefore reduced accordingly. Because of this, the adjustable horizontal tail group must supply a nose-up moment of lower intensity, meaning that the local impact on said adjustable horizontal tail group is less negative and that the latter will be effective at the moment when the flare will be invoked.

According to a first embodiment, which can be qualified as "preventive", the method according to the present invention is such that said predetermined lift value corresponds to the thrust of the engines needed for take-off. Such a value is generally known by the name TOGA (Take Off-Go Around). Thus, during a possible nose-down according to the phase of flying horizontally at low speed, the harmful situation in which the maximum-extended flaps are blown on by the airscrews of the engines running at the highest speed is avoided.

In a second embodiment, more dynamic than the previous one, said predetermined high value corresponds to a first threshold less than the thrust TOGA of the engines needed for the aircraft to take off, but, on the other hand, the at least partial retraction of the flaps is subject to the additional condition that a nose-down deflection command greater than a second threshold signifying nose-down is addressed to said elevators. Said first threshold may be at least approximately equal to 60% of the thrust TOGA of the engines needed for take-off, while said second threshold corresponds at least approximately to 60% of the total displacement, in the nose-down direction, of the control column available to the pilot to control said elevators.

In order to avoid unwanted triggerings near to the ground, the method according to the present invention is applied only when the altitude of the aircraft is greater than a third threshold which, for example, is at least approximately equal to 30 meters.

BRIEF DESCRIPTION OF THE DRAWINGS

The figures of the appended drawing clearly show how the invention can be implemented. In these figures, identical references denote similar items.

DETAILED DESCRIPTION OF THE INVENTION

Figure 1:
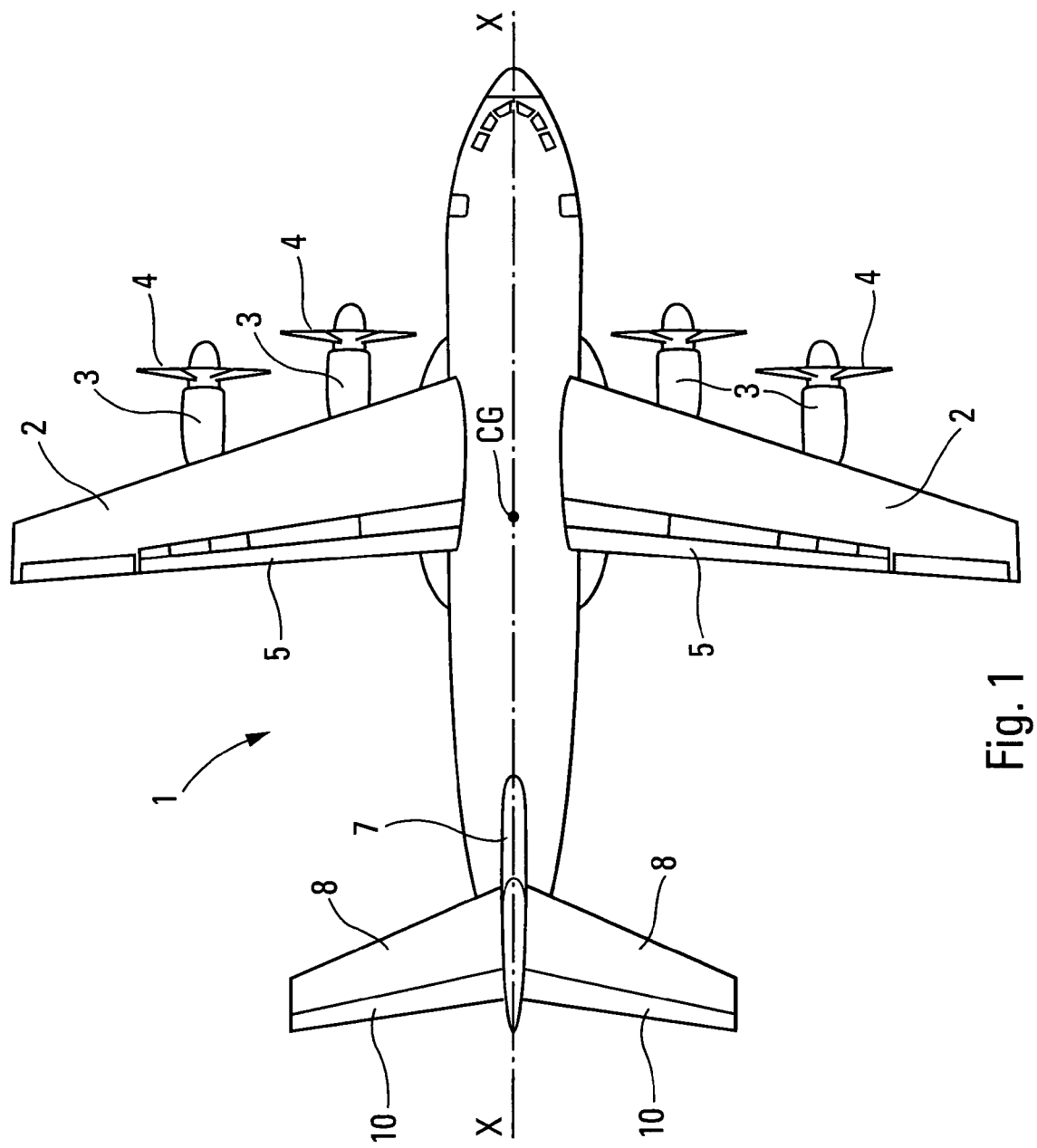
FIG. 1 is a plan view of an airplane to which the present invention can be applied, the wing flaps being shown in the retracted position.
Figure 2:
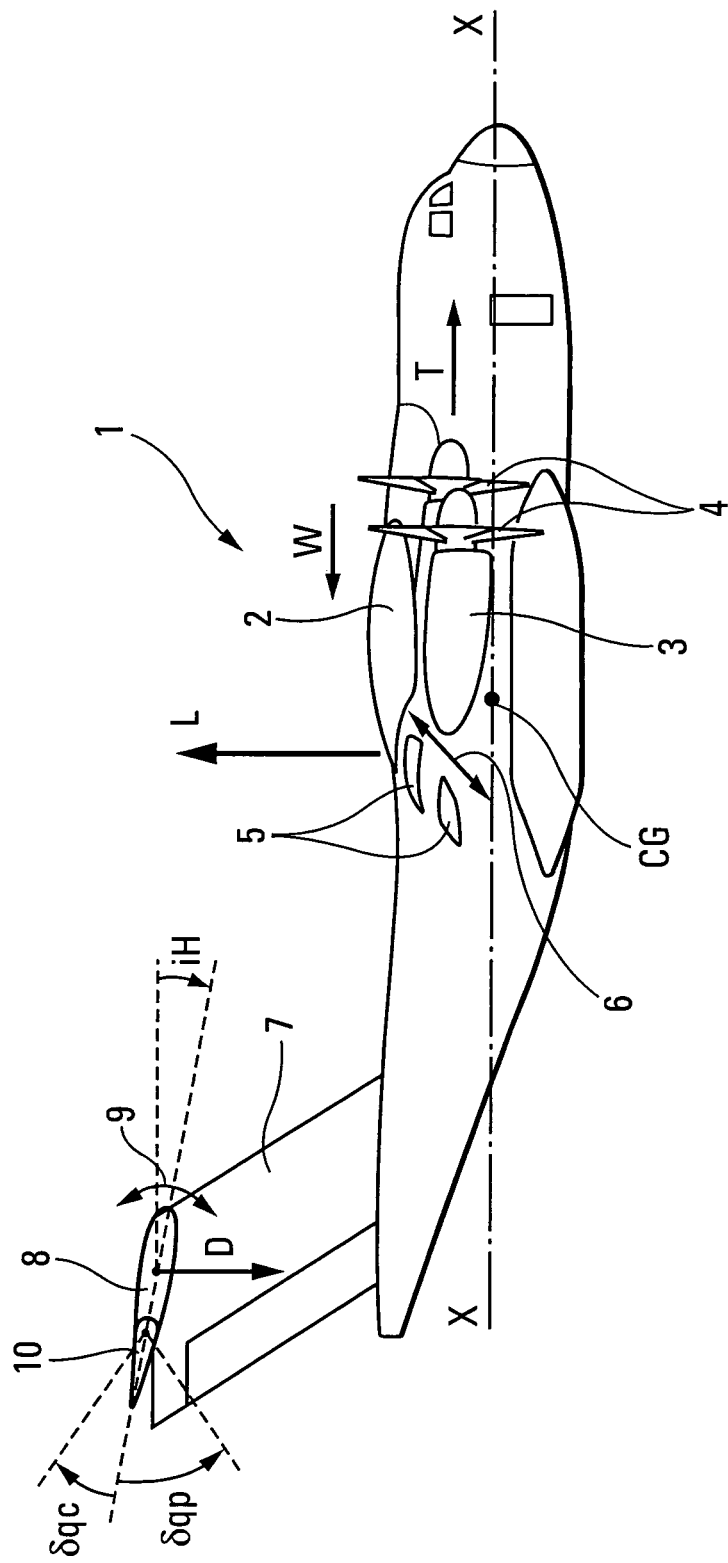
FIG. 2 is a side view, in horizontal flight and at low speed, of the airplane of FIG. 1, said flaps being shown diagrammatically in the extended position.

The transport airplane 1, shown diagrammatically in FIGS. 1 and 2, has a longitudinal axis X-X and comprises two symmetrical wings 2, each supporting two engines 3 with airscrews 4. The trailing edges of the wings 2 are provided with controllable moving high-lift flaps 5, that can assume a retracted position (see FIG. 1) and at least one extended position (see FIG. 2). The transition from the retracted position to an extended position is illustrated in FIG. 2 by the double arrow 6.

In its rear part, the airplane 1 is provided with a vertical tail group 7 supporting, at its top end, a horizontal tail group 8, tilt-adjustable as is illustrated by the double arrow 9 of FIG. 2. The trailing edge of the adjustable horizontal tail group 8 comprises elevators 10, hinged on the latter.

Figure 4:
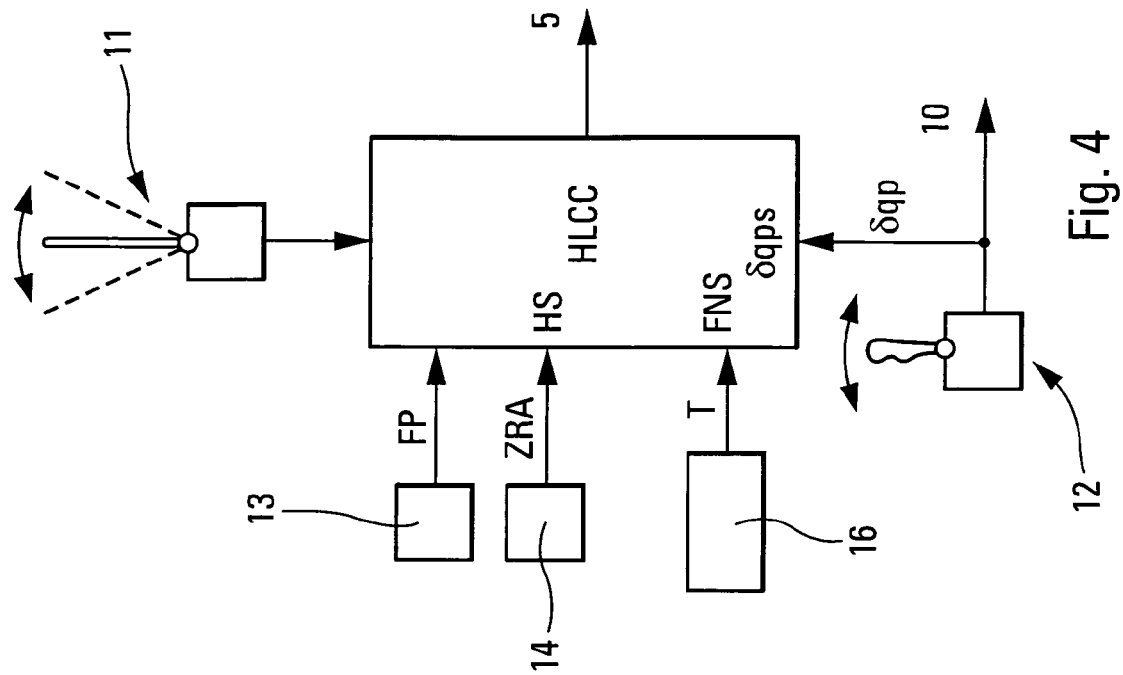
FIGS. 3 and 4 illustrate two variants of embodiment of the method according to the invention.
Figure 3:
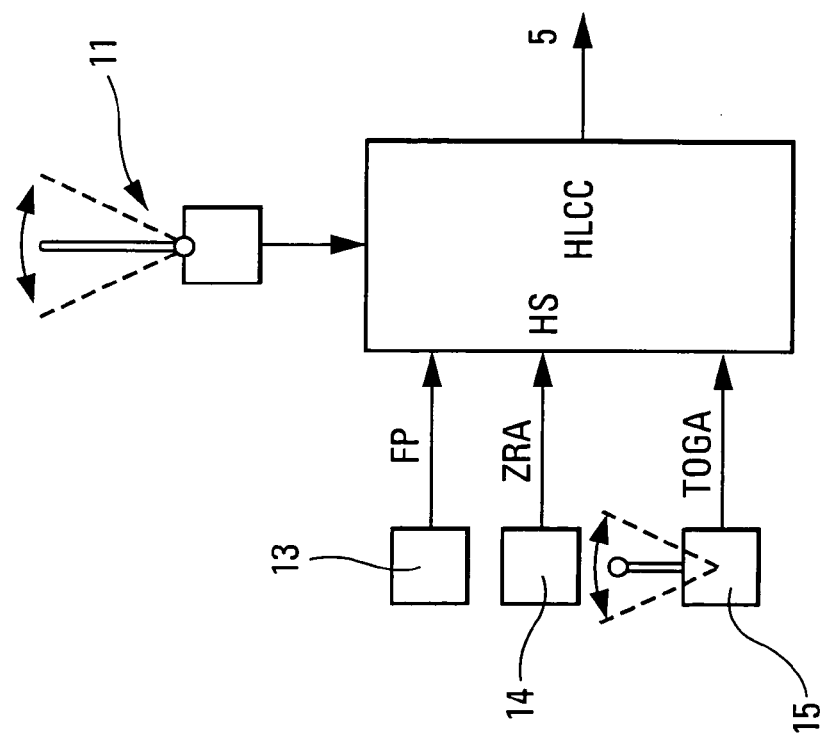

As is diagrammatically illustrated by FIGS. 3 and 4, the flaps 5 are controlled, for extension and retraction, by at least one flap control computer HLCC, which receives commands from the flap control lever 11, available to the pilot of the airplane 1.

In horizontal flight at low speed (see FIG. 2), the flaps 5 are extended to enable the wings 2 to impart on the airplane 1 a high lift L. This high lift L, augmented by blowing on the wings 2 and the extended flaps 5 by the wind W generated by the airscrews 4 and aided by the thrust T of the engines, exerts, on the airplane 1, a nose-down moment relative to the center of gravity CG of the latter. To balance this nose-down moment, it is necessary to deflect the adjustable horizontal tail group 8 to nose-up so that it generates a negative lift D generating an opposing nose-up moment relative to said center of gravity.

In this case, as is illustrated in FIG. 2, said adjustable horizontal tail group 8 is tilted to nose-up by an angle iH relative to the axis X-X and the elevators 10 are advantageously in aerodynamic extension of said adjustable horizontal tail group 8. The result is that, on said adjustable horizontal tail group 8, the local impact is strongly negative.

Therefore, if the pilot orders an abrupt nose-down, by imposing on the elevators 10 a nose-down deflection $\delta qp$ via the control column 12 available to him (see FIG. 4), the local impact on said adjustable horizontal tail group can exceed the stalling effect. Subsequently, at the moment when the pilot wants to level the airplane 1 by imposing on the elevators 10 a nose-up deflection $\delta qc$ via the control column 12, the airplane will be incapable of performing the necessary flare.

The two variants of embodiment of the method according to the present invention, illustrated diagrammatically and respectively in FIGS. 3 and 4, make it possible to avoid this situation. In these FIGS. 3 and 4, an HLCC computer is shown which is capable of controlling the extension and the retraction of the flaps 5, the lever 11 for deliberately controlling the flaps 5 via the HLCC computer, a sensor 13 for delivering to the latter a signal FP representative of the fact that the flaps 5 are in the maximum extended position and a radio-altimetric probe 14 sending to the HLCC computer the altitude ZRA of the aircraft 1.

Furthermore, in the variant of FIG. 3, the HLCC computer receives, from the HLCC gas levers 15 available to the pilot and controlling the speed of the engines 3, a TOGA signal, indicating that this speed is the maximum speed. In the variant of FIG. 4, instead of being linked to the gas levers 15, the HLCC computer is linked, on the one hand, to an on-board computer 16, for example an FADEC (Full Authority Digital Engine Control) computer capable of sending it a measurement of the current thrust T and, on the other hand, to the control column 12 transmitting to said HLCC computer at least the nose-down commands $\delta qp$ that it addresses to the elevators 10.

The logic systems of the two variants of embodiment of the method of FIGS. 3 and 4 are implemented in the respective HLCC computer and, to this end:

the HLCC computer of FIG. 3 contains an altitude threshold HS, for example at least approximately equal to 30 meters, below which the automatic retractions of the flaps 5 are disabled, in order to avoid movements of the latter not controlled by the pilot close to the ground; and the HLCC computer of FIG. 4 incorporates, in addition to the altitude threshold HS, the threshold FNS for the thrust T exerted by the engines 3 and a nose-down command threshold $\delta qps$ for the elevators 10.

The thrust threshold FNS can correspond at least approximately to 60% of the maximum thrust of said engines 3, while the threshold $\delta qps$ can correspond at least approximately to 60% of the maximum nose-down travel of the control column 12.

In the variant of embodiment of FIG. 3, the HLCC computer controls an at least partial retraction of the flaps 5, when the following three conditions are satisfied:

the measured altitude ZRA of the airplane 1 is greater than said threshold HS, the flaps 5 are in the maximum extended position, which is indicated by the signal FP, and the gas levers are in the TOGA position.

Thus, in this variant of embodiment, the airplane 1 cannot be in a critical position for which, at the same time, the flaps 5 would be in the maximum extended position and the engines 3 would be exerting their maximum thrust. In effect, thanks to the present invention there then occurs an at least partial retraction of the flaps, such that the value of the nose-up angle iH of the adjustable horizontal tail group 8 can be smaller, which improves the stalling margin of the latter at the time of a flare following a nose-down.

In the variant of embodiment of FIG. 4, the HLCC computer controls an at least partial retraction of the flaps 5, when the following four conditions are satisfied:

the measured altitude ZRA of the airplane 1 is greater than said threshold HS, the flaps 5 are in the maximum extended position, the measured thrust T, exerted by the engines 3, is greater than the threshold FNS, and the nose-down command $\delta pq$ generated by the control column 12 is greater than the threshold $\delta pqs$.

Here, too, the stalling margin of the adjustable horizontal tail group 8 is improved at the time of a flare following a nose-down, starting from a phase of horizontal flight at low speed.

The invention claimed is:

1. A method to ensure the safety of an aircraft flying horizontally at low speed, comprising the steps of:
    providing an aircraft comprised of:
        a vertical tail group supporting a tilt-adjustable horizontal tail group that includes elevators,
        an airscrew provided on an engine supported by a fixed wing of the aircraft,
        extendable and retractable trailing-edge high-lift flaps on the wing of the aircraft, and
        a controller configured to control extension and retraction of the high-lift flaps;
    flying the aircraft horizontally at low speed;
    orienting said high-lift flaps in an extended position during the horizontal flight of the aircraft;
    blowing wind generated by said airscrew onto the wing of the aircraft and onto the high-lift flaps oriented in said extended position to generate a nose-down moment;
    deflecting the tilt-adjustable horizontal tail group during the horizontal flight to generate a nose-up moment and counteract the nose-down moment; and
    retracting the high-lift flaps by the controller during the horizontal flight, wherein the controller is configured to retract the high-lift flaps at a condition in which an engine thrust signal received by the controller becomes equal to or greater than a predetermined high value that corresponds to the engine thrust needed for the aircraft to take-off.

2. The method as claimed in claim 1, wherein the retracting step is applied only when said aircraft is at an altitude greater than a threshold HS.

3. The method as claimed in claim 2, wherein said threshold HS is approximately equal to 30 meters.

4. The method as claimed in claim 1, wherein the high-lift flaps are retracted to an extent that prevents a stalling effect for the horizontal tail group in the event of a dive and subsequent flare of the aircraft.

5. The method as in claim 1, wherein the tilt-adjustable horizontal tail group is located at a top end of the vertical tail group.

6. The method as in claim 1, wherein the elevators are hinged to the adjustable horizontal tail group.

7. A method to ensure the safety of an aircraft flying horizontally at low speed, comprising the steps of:
providing an aircraft comprised of:
a vertical tail group supporting a tilt-adjustable horizontal tail group that includes elevators,
an airscrew provided on an engine supported by a fixed wing of the aircraft,
extendable and retractable trailing-edge high-lift flaps on the wing of the aircraft, and
a controller configured to control extension and retraction of the high-lift flaps;
flying the aircraft horizontally at low speed;
orienting said high-lift flaps in an extended position during the horizontal flight of the aircraft;
blowing wind generated by said airscrew onto the wing of the aircraft and onto the high-lift flaps oriented in said extended position to generate a nose-down moment;
deflecting the tilt-adjustable horizontal tail group during the horizontal flight to generate a nose-up moment and counteract the nose-down moment; and
retracting the high-lift flaps by the controller during the horizontal flight, wherein the controller is configured to retract the high-lift flaps at conditions corresponding to a first threshold condition in which engine thrust is less than the engine thrust needed for the aircraft to take-off and a second threshold condition in which a nose-down command is applied to the elevators.

8. The method as claimed in claim 7, wherein said first threshold is approximately equal to 60% of the engine thrust needed for take-off.

9. The method as claimed in claim 7, wherein said second threshold corresponds to approximately 60% of a total nose-down travel of a control column.

10. An aircraft comprising:
a vertical tail group supporting a tilt-adjustable horizontal tail group that includes elevators;
an airscrew provided on an engine supported by a fixed wing of the aircraft;
extendable and retractable trailing-edge high-lift flaps on the wing of the aircraft;
a sensor configured to sense an extended position of the flaps and deliver a signal that the flaps are in an extended position; and
a controller for controlling the extension and retraction of the flaps, wherein the controller is configured to receive the signal sent from the sensor and an engine thrust signal from a gas lever, and controls the high-lift flaps to retract from the extended position at conditions in which:
the aircraft is flying horizontally,
the high-lift flaps are oriented in the extended position during the horizontal flight,
wind generated by the airscrew is blown onto the wing of the aircraft and onto the high-lift flaps oriented in the extended position during the horizontal flight to generate a nose-down moment,
the tilt-adjustable horizontal tail group is deflected during the horizontal flight to generate a nose-up moment and counteract the nose-down moment, and
the controller receives the engine thrust signal, in which the signal is equal to or greater than a predetermined value corresponding to the engine thrust needed for the aircraft to take-off.

11. An aircraft comprising:
a vertical tail group supporting a tilt-adjustable horizontal tail group that includes elevators;
an airscrew provided on an engine supported by a fixed wing of the aircraft;
extendable and retractable trailing-edge high-lift flaps on the wing of the aircraft;
a sensor configured to sense an extended position of the flaps and deliver a signal that the flaps are in the extended position; and
a controller for controlling the extension and retraction of the flaps, wherein the controller is configured to receive an engine thrust signal from an on-board computer, and controls the high-lift flaps to retract from the extended position at conditions in which:
the aircraft is flying horizontally,
the high-lift flaps are oriented in the extended position during the horizontal flight,
wind generated by the airscrew is blown onto the wing of the aircraft and onto the high-lift flaps oriented in the extended position during the horizontal flight to generate a nose-down moment,
the tilt-adjustable horizontal tail group is deflected during the horizontal flight to generate a nose-up moment and counteract the nose-down moment, and
the controller receives the thrust signal at a predetermined value corresponding to a first threshold condition in which the engine thrust is less than the engine thrust needed for the aircraft to take-off and a second threshold based on a nose-down command being applied to the elevators.

* * * * *